US007010802B1

(12) United States Patent
Bernath et al.

(10) Patent No.: US 7,010,802 B1
(45) Date of Patent: Mar. 7, 2006

(54) PROGRAMMABLE PATTERN MATCH ENGINE

(75) Inventors: Brett A. Bernath, San Diego, CA (US); Moshe Goldenberg, Karmiel (IL); John M. Brooks, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/516,284

(22) Filed: Mar. 1, 2000

(51) Int. Cl.
*H04N 7/173* (2006.01)

(52) U.S. Cl. .......................... 725/111; 725/68; 725/85; 725/100; 370/222; 370/463

(58) Field of Classification Search ................ 725/111, 725/85, 100, 131, 139, 151, 68; 370/465–486, 370/242, 222
See application file for complete search history.

(56) References Cited

U.S. PATENT DOCUMENTS

| | | | | |
|---|---|---|---|---|
| 5,553,067 | A * | 9/1996 | Walker et al. | 370/390 |
| 6,137,793 | A * | 10/2000 | Gorman et al. | 370/360 |
| 6,208,645 | B1 * | 3/2001 | James et al. | 370/389 |
| 6,216,171 | B1 * | 4/2001 | Isono et al. | 709/250 |
| 6,308,328 | B1 * | 10/2001 | Bowcutt et al. | 725/111 |
| 6,324,184 | B1 * | 11/2001 | Hou et al. | 370/468 |
| 6,377,782 | B1 * | 4/2002 | Bishop et al. | 455/3.01 |
| 6,424,632 | B1 * | 7/2002 | Poret et al. | 370/395.3 |
| 6,434,165 | B1 * | 8/2002 | Sherer et al. | 370/465 |
| 6,459,427 | B1 * | 10/2002 | Mao et al. | 725/109 |
| 6,504,838 | B1 * | 1/2003 | Kwan | 370/352 |
| 6,507,592 | B1 * | 1/2003 | Hurvig et al. | 370/503 |
| 6,510,162 | B1 * | 1/2003 | Fijolek et al. | 370/432 |
| 6,598,057 | B1 * | 7/2003 | Synnestvedt et al. | 707/200 |
| 6,618,353 | B1 * | 9/2003 | Merrill et al. | 370/225 |

(Continued)

OTHER PUBLICATIONS

WO 01/50706 A2, Broerman et al., application operation in an Internet compatible bi-directional communication system, Jan. 5, 2000.*

*Primary Examiner*—Chris Kelley
*Assistant Examiner*—Annan Shang
(74) *Attorney, Agent, or Firm*—Christopher J. Rourk; Godwin Gruber LLP

(57) ABSTRACT

A communication device such as a cable modem that has a first interface for receiving data from a cable media, and a pattern matching engine that evaluates patterns in the data that is received at the first interface of the cable modem and that enables the determination of appropriate procedures for treatment of the data. The pattern matching engine of the cable modem may be configured to match address segments of the data that is received at the first interface of the cable modem. In addition, the pattern matching engine is often a programmable pattern matching engine that may be programmed according to patterns that are desired to matched during various operations of the cable modem. Of note, the pattern matching engine enables pattern matching of various length frame portions. Various aspects of the present invention may also be found in a method for a communication device to compare a predetermined pattern to a pattern that corresponds to a portion of a data frame. The method includes determining acceptable parameters for the data frames that are to be received at the communication device; programming the acceptable parameters into a pattern matching engine in the communication device; receiving a data frame at the communication device; parsing the data frame to obtain a predetermined portion of the data frame; comparing the predetermined portion of the data frame with the acceptable parameters stored in the pattern matching engine; and registering the result of the comparison in a suitable format for access by a microprocessor.

15 Claims, 3 Drawing Sheets

U.S. PATENT DOCUMENTS

| | | | | |
|---|---|---|---|---|
| 6,618,386 | B1 * | 9/2003 | Liu et al. | 370/401 |
| 6,636,971 | B1 * | 10/2003 | Loukianov | 713/189 |
| 6,643,780 | B1 * | 11/2003 | Cooper | 713/201 |
| 6,650,624 | B1 * | 11/2003 | Quigley et al. | 370/252 |
| 6,658,010 | B1 * | 12/2003 | Enns et al. | 370/401 |
| 6,662,135 | B1 * | 12/2003 | Burns et al. | 702/120 |
| 6,785,288 | B1 * | 8/2004 | Enns et al. | 370/401 |
| 6,917,614 | B1 * | 7/2005 | Laubach et al. | 370/392 |
| 2004/0259605 | A1 * | 12/2004 | Quigley et al. | 455/574 |

* cited by examiner

PROGRAMMABLE PATTERN MATCH ENGINE

INCORPORATION BY REFERENCE

The following applications are hereby incorporated by reference, each in its entirety:

1) U.S. patent application Ser. No. 09/409,820, filed Sep. 30, 1999, entitled "Asochronous Centralized Multi-Channel DMA Controller";
2) U.S. patent application Ser. No. 09/410,167, filed Sep. 30, 1999, entitled "System and Method For Providing An Improved Synchronous Operation Of An Advanced Peripheral Bus With Backward Compatibility";
3) U.S. Provisional application Ser. No. 60/183,130, filed Feb. 17, 2000, entitled "Cable Modem Having A Programmable Media Access Controller"; and
4) U.S. patent application Ser. No. 09/516,096, filed even date herewith, entitled "Method for Reassembling Fragmented MAC Frames From Transport Layer Frames While Performing Decryption/CRC Operations."

BACKGROUND

1. Field of the Invention

The present invention relates to a cable modem, in particular to a cable modem having a pattern matching system for quick and flexible determinations concerning actions to take regarding frames of the cable modem.

2. Description of the Related Art

In recent years, cable television networks have become widespread. A typical cable television system can carry many television stations, and is effectively a high bandwidth system. Because of the increasing availability of cable television infrastructure, the use of television cables as the medium for computer data networks has the potential for giving users high bandwidth at a reasonable cost. A cable television system, however, requires several enhancements in order to function as a data network.

In its classic form, a cable television system carries information in only one direction from the cable system headend to the individual user. The user interface to the system generally comprises a receiver such as a television or a stereo. The headend transmits television or stereo channels simultaneously. In general, the user has no influence on what is transmitted and can only choose among the channels the headend is transmitting.

In contrast, a data network carries data from the headend to the user (the downstream path) and from the user to the headend (the upstream path). The individual user requires equipment, such as a cable modem, that can both receive from the headend and transmit to it. A cable data network must be able to handle many individual users simultaneously, each of whom have control over what they receive and transmit.

Cable modems offer greatly improved bandwidth capable of delivering services hundreds, or even thousands, of times faster than conventional modems. Cable modems can achieve data-transfer rates of up to 40 Mbits/s by connecting directly to coaxial lines as opposed to dial-in modems that use twisted-pair copper telephone lines.

In order for a cable television network to operate as a data network, it requires a headend capable of both transmitting and receiving data. To ensure that each user receives the data they require, a network protocol must be implemented to allow independent users of the network to utilize the shared headend and the distribution network without interference from or receiving the data of other users.

The network protocol places requirements on both the headend and the user end. Generally, the headend serves as the network controller, and the user's cable modem must be able to respond to commands from the headend. In cable modems adhering to the well-known OSI reference model, the lowest layer is the Physical layer (PHY), while the next layer up is the Data Link layer. The Data Link layer is segmented into two parts, the Medium Access Controller (MAC), which interfaces with the PHY, and the Logical Link Control (LLC), which interfaces to the MAC and to higher layers. In general, the MAC and LLC provide the following Data Link functionality: transmit and receive data encapsulation, including framing (frame boundary delineation, frame synchronization), addressing (management of source and destination address), and error detection (detection of physical medium transmission errors); and media access management, including collision avoidance and handling. A physical address or MAC address is a unique Data Link layer address that is assigned to every port or device that connects to a network. Other devices in the network use these addresses to locate specific ports in the network and to create and update routing tables and data structures.

In an effort to coordinate the development of multimedia high-speed data services and the interoperability of network devices, cable operators have formed the Multimedia Cable Network Systems (MCNS) Group in cooperation with the industry research and development consortium CableLabs. The MCNS group has promulgated the Data Over Cable Service Interface Specification (DOCSIS). Other standards utilizing transport frames, such as DAVIC/DVB, have likewise been created. Such standards continue to evolve over time, with the frequent inclusion of additional feature sets. In specifications such as DOCSIS, MAC-layer frames are encapsulated in transport-layer frames, such as MPEG frames.

The term "cable modem termination system" (CMTS) generally refers to a cable bridge or cable router in the cable head-end. A CMTS acts as the master station in a DOCSIS-compliant cable data system. The CMTS is generally the only station that transmits downstream, and it controls the scheduling of upstream transmissions by associated cable modems.

In a shared network, such as a cable modem network deployed over a large residential area, upstream and downstream data could be intercepted and read by anyone along the path between a specific cable modem and the cable head-end. Accordingly, some form of security is needed to protect those cable system operators, as well as owners of intellectual property from theft or denial of service. The MCNS specification attempts to address these needs by providing for privacy, authentication, and service integrity through the use of strong cryptography.

In addition, data that is received at a cable modem often consumes processing time from the cable modem. The processing time is wasted if the data is not of any use to the cable modem. Thus, early detection of data relevance is desired. This detection could occur by matching certain patterns in the data, e.g., MAC addresses, IP addresses, etc., with predetermined patterns. Software implementations of this pattern matching are unacceptably slow and hardware implementations are inflexible.

Many other problems and disadvantages of the prior art will become apparent to one skilled in the art after comparing such prior art with the present invention as described herein.

SUMMARY OF THE INVENTION

Various aspects of the present invention may be found in a communication device such as a cable modem that has a first interface for receiving data from a cable media, and a pattern matching engine that evaluates patterns in the data that is received at the first interface of the cable modem and that enables the determination of appropriate procedures for treatment of the data.

The pattern matching engine of the cable modem may be configured to match address segments of the data that is received at the first interface of the cable modem. In addition, the pattern matching engine is often a programmable pattern matching engine that may be programmed according to patterns that are desired to matched during various operations of the cable modem. Also, the pattern matching engine may enable determination of whether to accept a frame at the cable modem quicker than if the cable modem were required to wait on processing at a central microprocessor. Of note, the pattern matching engine enables pattern matching of various length frame portions. For example, the various length frame portions are selected from the group consisting of bit length, byte length, word length, double word length, kilobyte length, and megabyte length.

Various aspects of the invention may also be found in a communication device for sending and receiving data. The communication device includes a receiving transducer for receiving data, and a pattern matching engine configured to prevent the communication device from processing data that matches a predetermined pattern.

The communication device may be a cable modem thereby causing the receiving transducer to receive the data from a cable media. The pattern matching engine of the communication device may be a programmable pattern matching engine that may be programmed to match a portion of a plurality of types of frames that are received at the receiving transducer.

Various aspects of the present invention may be found in a method for a communication device to compare a predetermine pattern to a pattern that corresponds to a portion of a data frame. The method includes determining acceptable parameters for the data frames that are to be received at the communication device; programming the acceptable parameters into a pattern matching engine in the communication device; receiving a data frame at the communication device; parsing the data frame to obtain a predetermined portion of the data frame; and comparing the predetermined portion of the data frame with the acceptable parameters stored in the pattern matching engine. The result of the comparison may then be registered in a suitable format for access by a microprocessor.

The method may also include reading the registered results with a microprocessor such that the microprocessor may determine whether to drop or accept the data frame that has been received at the communication device. The predetermined portion of the data frame may be an address portion of the data frame.

Other aspects of the present invention will become apparent with further reference to the drawings and specification which follow.

BRIEF DESCRIPTION OF THE DRAWINGS

A better understanding of the present invention can be obtained when the following detailed description of the drawings is considered in conjunction with the following drawings.

DETAILED DESCRIPTION OF THE DRAWINGS

Figure 1:
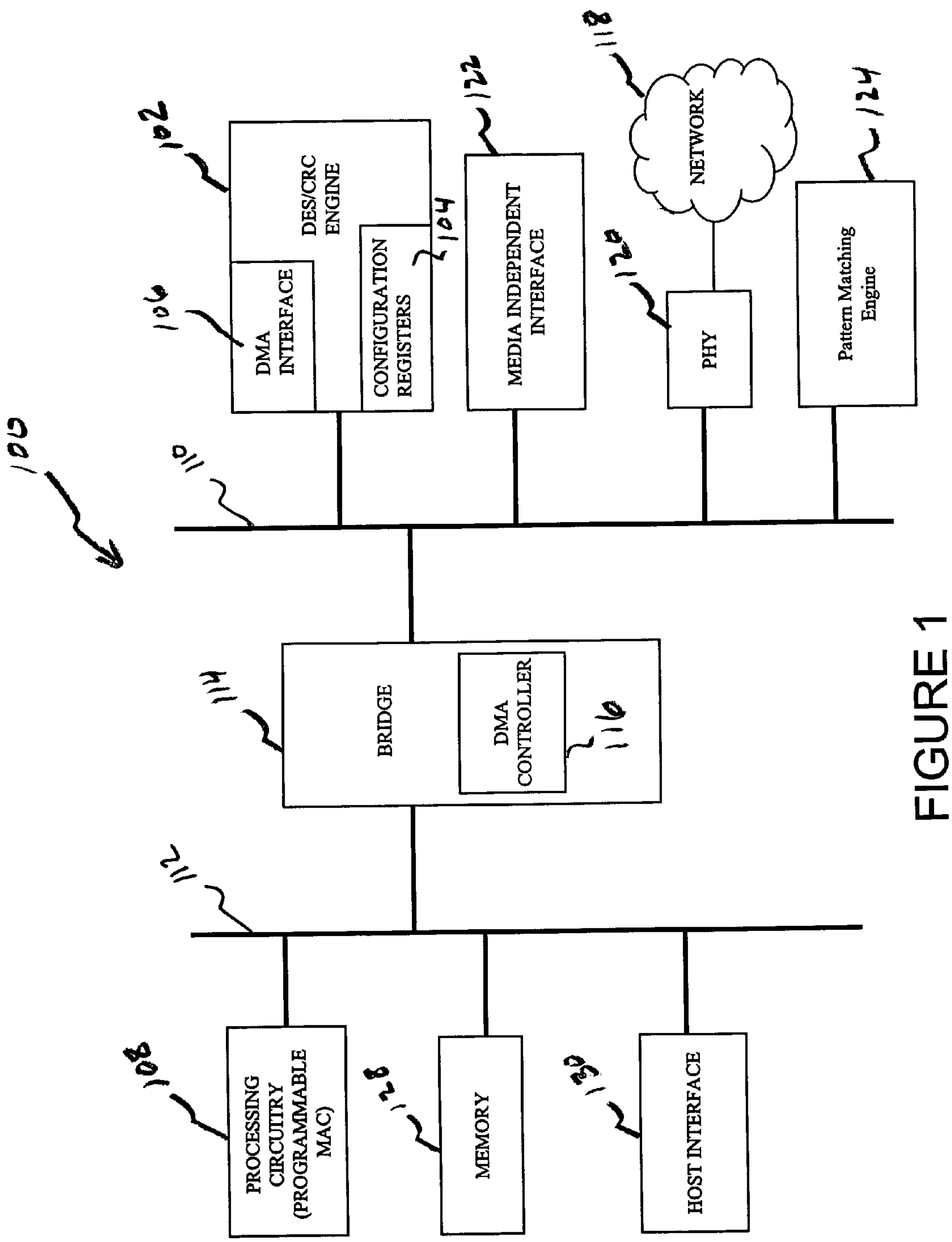
FIG. 1 is a block diagram of an exemplary communication device such as a cable modem having a programmable media access controller and DES/CRC engine according to the present invention.

FIG. 1 is a block diagram of an exemplary communication device such as a cable modem 100 having a programmable media access controller (MAC) and DES/CRC engine according to the present invention. In addition, a programmable pattern matching engine 124 is provided. In one embodiment the programmable pattern matching engine 124 enables the cable modem 100 to quickly and flexibly determine whether or not to drop or accept a received frame based upon whether or not certain bytes in the frame match a certain pattern. In certain embodiments, by "quickly," it is meant that the pattern matching engine 124 recognizes a pattern faster than a microprocessor can write to a register and read the result. In some embodiments, by "flexibly," it is meant that various byte patterns and pattern lengths may be matched by the pattern matching engine 124. In other words, multiple pattern matching engines can be implemented in the cable modem 100 to implement a variety of filtering functions. Of note, it is often necessary to associated values with the matched pattern.

The cable modem 100 receives transport/layer frames that encapsulate fragmented MAC frames. The DES/CRC engine may be programmed by the programmable MAC to perform encryption and/or CRC operations on a fragment-by-fragment basis while reassembling MAC frames. The programmable DES/CRC engine enhances the performance of the cable modem 100 incorporating programmable MAC functionality by moving computationally intensive functions to hardware while keeping control functions within software. The programmable nature of the cable modem 100 permits it to support evolving standards, such as DOCSIS, without the requirement of concomitant hardware upgrades.

The disclosed communication device, taking the form of the cable modem 100, can be implemented in a variety of products, including external or internal cable modems with Ethernet and/or USB connections, multifunction home-networking products, interactive set-top-box solutions, digital satellite receivers, wireless networking devices having antennas, Small Office/Home Office (SOHO) equipment and Internet Protocol (IP) telephony products. Accordingly, various embodiments of the invention may interface with non-traditional "cable" media (e.g., any type of media capable of transporting MPEG packets), and the precise nature of the data transmission media is not considered critical to the invention. The cable modem 100 may be compliant with any of a number of standards, including but not limited to, DOCSIS, DAVIC/DVB (Digital Video Broadcasting) and Voice Over IP (VoIP) standards. In the case of DOCSIS, typical MAC functionality includes MPEG and MCNS decoding and frame synchronization. The disclosed circuitry may be part of single integrated circuit, or a combination of integrated circuits. Alternatively, host system circuitry may be leveraged to perform certain of the programmable MAC functions described herein.

In the cable modem 100, a programmable DES/CRC engine 102 is provided for reassembling fragmented MAC frames. The DES/CRC engine 102 is capable of performing DES encryption or decryption, and/or CRC operations on a stream of data supplied by a DMA controller 116. The DES/CRC engine 102 includes a plurality of configuration registers 104 for receiving programming information from other system components. The configuration registers 104 may store a wide range of information. For example, DES keys, CRC vectors, and pointers to buffered frame fragments and destination buffers may be loaded into the configuration registers 104. In addition, the DES/CRC engine 102 of this embodiment of the invention includes a DMA interface 106 for coordinating the transfer of information to and from memory buffers. Additional DES/CRC engines 102 may be provided to permit a plurality of data flow threads to be processed simultaneously or to permit processing of interleaved data. Although the disclosed embodiment of the invention utilizes the well-known DES algorithm, it will be appreciated that the cable modem 100 could be configured to use various other public and proprietary encryption/decryption algorithms.

In the disclosed embodiment of the invention, processing circuitry 108 is programmed to implement the desired MAC functionality. The processing circuitry 108 is designed for high-performance data processing. The processing circuitry 108 may also provide operating system support and manage some message processing and scheduling. It is contemplated that the processing circuitry 108 may include a plurality of processor cores in which operating system and MAC functionality are separated. One such implementation, as well as further details of contemplated cable modem circuitry, may be found in a previously-incorporated U.S. patent application Ser. No. 60/183,130, entitled "Cable Modem Having a Programmable Media Access Controller". Alternatively, host system circuitry may perform the programmable MAC functions.

The programmable MAC 108 may specify processing control for each separate frame fragment. The DES/CRC engine 102 operates in conjunction with the DMA controller 116 to pull in fragments of data from varying memory segments with possibly different byte alignments, processes the segments (DES and/or CRC) as if the data were a continuous frame, and then sends the processed data frame back to a contiguous memory segment. The DES/CRC engine 102 can operate in at least three modes; no DES, CRC generation or checking; decryption, CRC checking; and encryption, CRC generation. The desired mode may be selected by writing to a field of the configuration registers 104. Additionally, in encryption mode, the DES/CRC engine 102 may encrypt and impend a calculated CRC to the output data.

The DES/CRC engine 102 receives the MAC frame one fragment at a time. It is possible for the MAC frame to be delivered in one, two, or three or more, thus creating various control and data flow setup conditions. The programmable MAC functionality assists the processing of each fragment of the MAC frame by programming control information into the appropriate configuration register 104 on both a fragment as well as a frame basis.

In one embodiment of the invention, the programmable MAC sets a bit in the configuration registers 104 at the beginning of each frame to initialize processing. This bit is cleared by the DES/CRC engine 102 at the end of processing the first fragment. A frame length value is also provided to the configuration registers 104 at the beginning of each frame. This value tells the DES/CRC engine 102 how many total bytes there are for all of the expected fragments to be processed for a given frame. A frame length value may also be provided, and is decremented as data is processed. The frame length value may be utilized for determining the number of bytes remaining in the frame, assuming the firmware updates the frame length value following each fragment. In the disclosed embodiment of the invention, incoming fragments are processed and sent out to a contiguous memory segment. Thus, the DMA destination pointer need only be updated once per frame.

The DES/CRC engine 102, as well as other circuitry described below, are coupled to a peripheral bus 110. The peripheral bus 110 of the disclosed embodiment of the invention is linked to a system bus 112 via bridge circuitry 114. The bridge circuitry 114 comprises a centralized multi-channel DMA controller 116 for facilitating the movement of data in the cable modem 100. The bridge 114 may serve as master of both a system bus 112 and peripheral bus 110, and utilizes burst transfers and pipelining of data to optimize bus efficiency. The DMA controller 116 of the disclosed embodiment is constructed to provide lower data latency, minimal data buffering, guaranteed data bandwidth, and asochronous demand support. Further details of one such DMA controller and associated circuitry may be found in previously-incorporated U.S. patent application Ser. No. 09/409,820, "Asochronous Centralized Multi-Channel DMA Controller". In the disclosed embodiment of the invention, the peripheral bus 110 provides the basic peripheral macrocell communications infrastructure. Such peripherals typically have interfaces which are memory-mapped registers, have few high-bandwidth interfaces, and are accessed under program control (such as the programmable MAC).

Bi-directional communication between the cable modem 100 and the network 118 is conducted by physical layer (PHY) circuitry 120 coupled to the peripheral bus 110. As will be appreciated by those skilled in the art, the PHY circuitry 120 may perform modulation, demodulation, and forward error correction functions.

The peripheral bus 110 and system bus 112 may comply with a wide variety of bus specifications and architectures. Accordingly, the programmable MAC 108 may be configured to operate with many different types of buses and interface with many types of peripheral devices. For example, in a host processor-based implementation, the system bus may take the form of a PCI bus or any other type of bus typically found in computer systems.

In one embodiment of the invention, the cable modem 100 utilizes the Advanced System Bus (ASB) and Advanced Peripheral Bus (APB) protocols and bus architectures as specified in the Advanced Microcontroller Bus Architecture (AMBA) specification. The AMBA specification defines an on-chip communication standard for designing high-performance embedded micro-controllers. The ASB is generally utilized for high-performance system modules, supporting the efficient connection of processors, on-chip memories, and off-chip external memory interfaces with low-power peripheral/macrocell functions. The APB is optimized for minimal power consumption and reduced interface complexity in supporting peripheral functions.

Another bus defined by AMBA is the Advanced High-Performance Bus (AHB). The AHB is generally utilized with high-performance, high-frequency system modules. Either the ASB or AHB may be utilized as the system bus 112, while the APB may be utilized as the peripheral bus 110. The system bus 112 functions to provide a high-bandwidth interface between system elements, such as memory 128, that are involved in the majority of data transfers.

The cable modem 100 of FIG. 1 may also include a number of optional interfaces for communicating with a host system or external devices. For example, a host system interface 130 and external/internal memory 128 may be provided on the system bus 112. Likewise, the peripheral bus 110 may support Media Independent Interface (MII) 122, as well as a General Purpose Input/Output (GPIO) interface, USB port, and a UART port (not shown). A number of other peripherals may also be coupled to the peripheral bus 110. For example, the programmable pattern matching engine 124. As will be appreciated, many other types of circuits and interfaces may be provided on the system bus 112 and peripheral bus 110, and the precise nature of supported devices is not considered critical to the invention.

The MII 122 may comprise an Ethernet Media Access Controller (EMAC). In one contemplated embodiment, the EMAC supports the MAC sub-layer of the IEEE space 802.3 specification and allows it to be connected to an IEEE 802.3 10/100 Mbps (100Base-T and 10Base-T) MII compatible EPHY device or seven-wire HomeLan PHY device. The MII 122 provides a port to transmit and receive data that is media independent, multi-vendor interoperable, and supports all data rates and physical standards. The port consists of data paths that are generally four bits wide in each direction, as well as control and management signals. The MII 122 can be configured as a glueless connection to support Ethernet or HomeLan serial mode.

Figure 2:
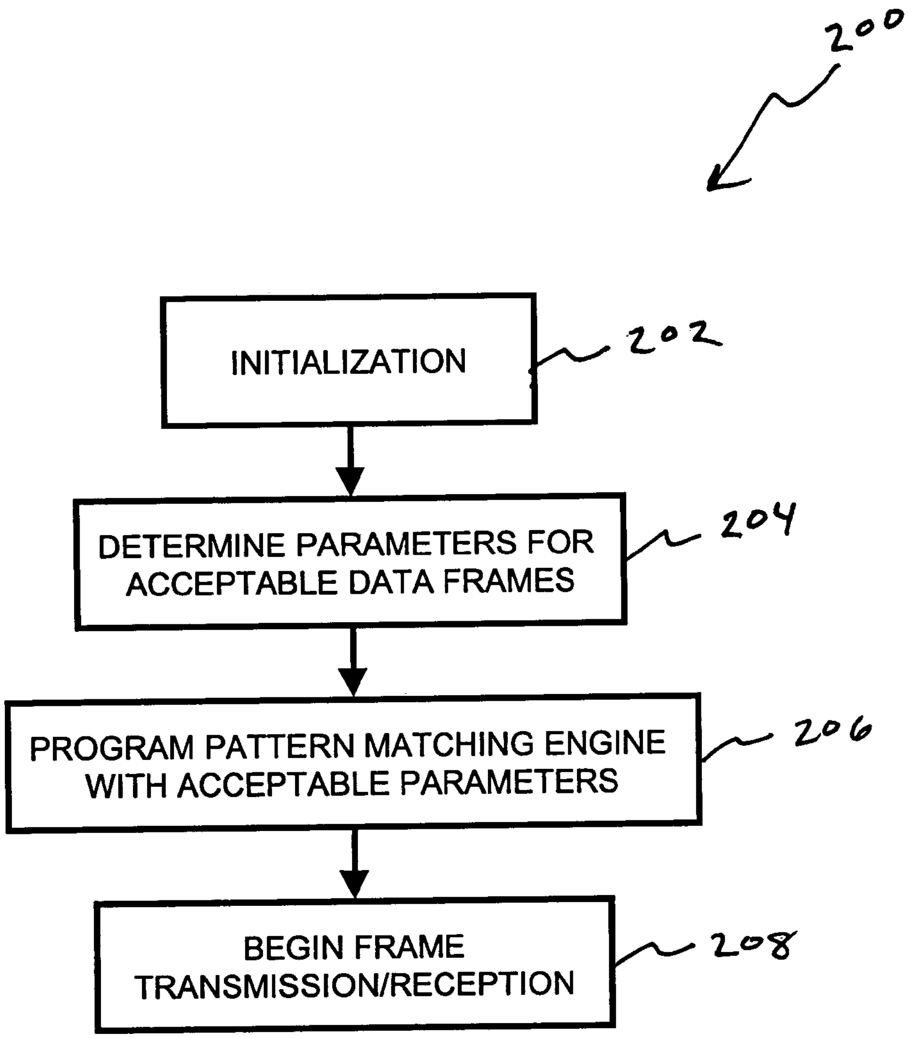
FIG. 2 is a flow diagram of an exemplary process wherein the pattern matching engine of FIG. 1 is programmed with parameters in preparation for the pattern matching procedures according to principles of the present invention.

FIG. 2 is a flow diagram 200 of an exemplary process wherein the pattern matching engine 124 is programmed with parameters in preparation for the pattern matching procedures according to principles of the present invention. In an initialization stage 202, the cable modem 100 is initialized in preparation for operation as described in relation to FIG. 1. Parameters are then determined that assist in the identification of acceptable data frames 204 in the cable modem 100. These acceptable parameters are then programmed 206 into the pattern matching engine 124 and frame transmission/reception begins 208. Of course, as understood by thos skilled in the art and viewing the present disclosure, frame transmission/reception 208 could being prior to or during the programming of the acceptable patterns 206 into the pattern matching engine. In this manner, it is contemplated that the pattern matching engine 124 may be programmed to limit the amount of data frames that the cable modem 100 must process, thereby enabling the transmission of data frames with a reduced amount of delay.

Figure 3:
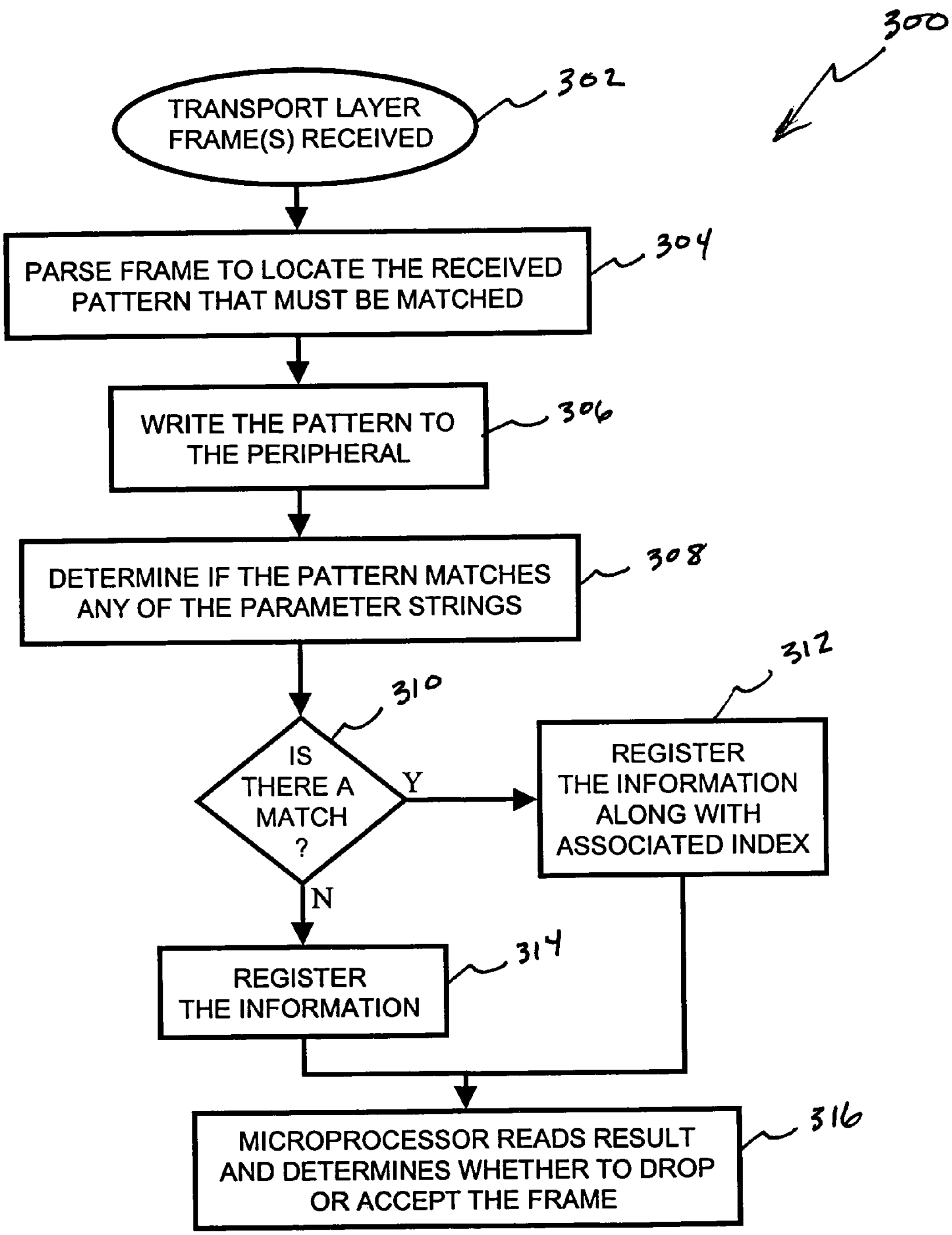
FIG. 3 is a flow diagram of an exemplary pattern matching process performed by the cable modem of FIG. 1 in accordance with principles of the present invention.

FIG. 3 is a flow diagram 300 of an exemplary pattern matching process performed by the cable modem 100 in accordance with principles of the present invention. Initially, one or more frames are received at the transport layer 302. This frame(s) is parsed to locate the received pattern that must be matched 304. Once the received pattern has been located, the pattern is written to a peripheral 306, e.g., the pattern matching engine 126. The previously programmed peripheral then determines if the pattern matches any of the parameter strings 308 that have been programmed into the peripheral. The flow diagram 300 proceeds to a decision block 310 where one path is followed in the event of a pattern match, and another path is followed in the event of no pattern match.

If there is a pattern match at the decision block 310, the information is registered along with an associated index 312. On the other hand, if there is no pattern match at the decision block 310, only the information is registered 314. Regardless of the branch that is taken at the decision block 310, the microprocessor reads the result and determines whether to drop or accept the frame 316 that was analyzed with the pattern matching engine 126. In this manner, frames may be filtered and the cable modem 100 is presented only those frames that may require further processing.

As understood by those skilled in the art and viewing the present disclosure, the length of the pattern to be matched may be measured in bits, bytes, words, etc. The pattern matching engine 126 allows the microprocessor to program it with the desired information. Further, the microprocessor is able to program the pattern matching engine with any number of parameter strings that match the length of the desired pattern, whether the length is measured in bits, bytes, words, etc. Each parameter string is associated with an index or pointer that is made available for the microprocessor to read if a given pattern is matched. The pattern matching engine 126 is much faster than the software implementation of the prior art and the configuration allows a comparison of the received pattern to each of the parameter strings to occur in a single clock cycle. Further, this embodiment is more flexible than a hardware state machine because the hardware filter is typically designed to filter on a known parameter within a given frame type. In the disclosed embodiment of the invention, the filter may be modified via a software upgrade, thus, enabling the same design to be used to support unknown future filtering requirements. The association of a programmable value with a matched parameter string allows the software to quickly retrieve information about a given frame.

For example, the pattern to be matched may be a MAC address, an IP address, etc. Further, another use according to principles of the present invention is LLC filtering. Also, contemplated is PID filtering, e.g., determining if the MPEG frame's PID equals the MCNS PID from a PID filter table that is programmed into the pattern matching engine 126. If the MPEG frame's PID equals the MCNS PID, then the MPEG PID filter process returns to the MPEG process to indicate that a valid PID has be found. On the other hand, if the MPEG frame's PID does not equal the MCNS PID, the MPEG PID filter process returns to the MPEG process and indicates that the PID is invalid.

Address filtering may be performed according to various rules, including SID and MAC address filtering. For example, SID filtering may be performed in an MCNS process in which MCNS frames that fail the SID filter criteria are rejected while MCNS frames that pass the SID filter proceed to the MAC address filter. Clearly, the address filtering may be used for address filtering on almost any type of address. Software is responsible for extracting the pattern from the frame that you are going to filter against. Thus, the pattern matching engine 126 may be used in a programmable MAC, in routers, bridges, LLC filters, IT filters, or virtually any type of system where some form of software process oversees the system.

The above-listed sections and included information are not exhaustive and are only exemplary for systems such as a cable modem. The particular sections and included information in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A system for receiving data comprising:

a programmable pattern matching engine receiving a pattern and a data stream and generating an index entry if the pattern is present in the data stream, wherein the programmable pattern matching engine performs one or more of address filtering, logical link control (LLC) filtering, protocol identifier (PID) filtering, and security ID (SID) filtering in a Multimedia Cable Network System (MCNS);

a programmable media access controller reading the index entry and determining whether to continue receipt of the data stream;

a CRC engine performing CRC processing of a received data frame if the programmable media access controller determines to continue receipt of the data stream; and a cable modem DMA controller coupled to the programmable media access controller, the programmable pattern matching engine, and the CRC engine, the cable modem DMA controller facilitating movement of data between the programmable media access controller, the programmable pattern matching engine, and the CRC engine.

2. The system of claim 1 further wherein the pattern comprises one or more of a MAC address, an IP address and a protocol identifier (PID) of an MPEG frame.

3. The system of claim 1 wherein the CRC engine further comprises a DES/CRC engine performing DES decryption or CRC processing of a received data frame if the programmable media access controller determines to continue receipt of the data stream.

4. A cable modem comprising:

a programmable media access controller;

a programmable pattern matching engine that is programmed by the media access controller, wherein the Programmable pattern matching engine Performs one or more of address filtering, logical link control (LLC) filtering, protocol identifier (PID) filtering, and security ID (SID) filtering in a Multimedia Cable Network System (MCNS);

a programmable CRC engine that is programmed by the media access controller, and a cable modem DMA controller coupled to the programmable media access controller, the programmable pattern matching engine, and the programmable CRC engine, the cable modem DMA controller facilitating movement of data between the programmable media access controller, the programmable pattern matching engine, and the programmable CRC engine.

5. The cable modem of claim 4 wherein the pattern matching engine matches address segments of data that is received at a first interface of the cable modem.

6. The cable modem of claim 5 wherein the pattern matching engine enables pattern matching of different length frame portions.

7. The cable modem of claim 6 wherein the different-length frame portions are selected from the group comprising bit length, byte length, word length, double word length, kilobyte length, and megabyte length.

8. The cable modem of claim 4 wherein the pattern matching engine determines whether to accept a frame at the cable modem quicker than if the cable modem were required to wait on processing at a central microprocessor.

9. The cable modem of claim 4 wherein patterns in the data comprise one or more of a MAC address, an IP address, and a protocol identifier PID of an MPEG frame.

10. The cable modem of claim 4 wherein an operation of the cable modem comprises one or more of logical link control (LLC) filtering, protocol identifier (PID) filtering, and security ED (SID) filtering in a Multimedia Cable Network System (MCNS).

11. The cable modem system of claim 4 wherein the programmable CRC engine performs DES decryption or CRC processing of a received data frame after a microprocessor receives data from the pattern matching engine and determines to accept a received frame based on the data received from the pattern matching engine.

12. A method for receiving data comprising:

determining two or more acceptable parameters for data frames that are to be received, wherein the acceptable parameters include one or more of address filtering, logical link control (LLC) filtering, protocol identifier (PID) filtering, and security ID (SID) filtering in a Multimedia Cable Network System (MCNS);

programming at least one of the acceptable parameters into a pattern matching engine;

programming at least one of the acceptable parameters into a DES/CRC engine;

receiving a data frame at a communication device;

passing the data frame to obtain a predetermined portion of the data frame;

comparing the predetermined portion of the data frame with at least one of the acceptable parameters stored in the pattern matching engine;

processing the data frame with the DES/CRC engine if the predetermined portion of the data frame matches that least one of the acceptable parameters; and facilitating movement of data between the programmable media access controller, the pattern matching engine, and the DES/CRC engine.

13. The method of claim 12 further comprising registering the result of the comparison in a suitable format for access by a microprocessor.

14. The method of claim 13 further comprising reading the registered results with a microprocessor such that the microprocessor may determine whether to drop or accept the data frame that has been received at the communication device.

15. The method of claim 13 wherein the predetermined portion of the data frame is an address portion of the data frame.

* * * * *

UNITED STATES PATENT AND TRADEMARK OFFICE

CERTIFICATE OF CORRECTION

PATENT NO. : 7,010,802 B1
APPLICATION NO. : 09/516284
DATED : March 7, 2006
INVENTOR(S) : Bemath et al.

It is certified that error appears in the above-identified patent and that said Letters Patent is hereby corrected as shown below:

Column 9,
Line 44, delete “Programmable” and insert -- programmable --.
Line 44, delete “Performs” and insert -- performs --.

Column 10,
Line 39, delete “passing” and insert -- parsing --.
Line 45, delete “that” and insert -- at --.

Signed and Sealed this

Twenty-seventh Day of June, 2006

JON W. DUDAS
*Director of the United States Patent and Trademark Office*